(12) United States Patent
Saitou

(10) Patent No.: US 10,429,970 B2
(45) Date of Patent: Oct. 1, 2019

(54) DISPLAY DEVICE

(71) Applicant: Japan Display Inc., Tokyo (JP)

(72) Inventor: Masanari Saitou, Tokyo (JP)

(73) Assignee: Japan Display Inc., Tokyo (JP)

( * ) Notice: Subject to any disclaimer, the term of this patent is extended or adjusted under 35 U.S.C. 154(b) by 332 days.

(21) Appl. No.: 15/413,482

(22) Filed: Jan. 24, 2017

(65) Prior Publication Data

US 2017/0235397 A1 Aug. 17, 2017

(30) Foreign Application Priority Data

Feb. 17, 2016 (JP) ................................. 2016-027830

(51) Int. Cl.
| | | |
|---|---|---|
| *G06F 3/041* | (2006.01) | |
| *G02F 1/1333* | (2006.01) | |
| *G02F 1/1343* | (2006.01) | |
| *G02F 1/1362* | (2006.01) | |
| *G02F 1/1368* | (2006.01) | |
| *G06F 3/044* | (2006.01) | |
| *G06F 3/047* | (2006.01) | |

(52) U.S. Cl.
CPC .......... *G06F 3/0412* (2013.01); *G02F 1/1368* (2013.01); *G02F 1/13338* (2013.01); *G02F 1/133345* (2013.01); *G02F 1/134309* (2013.01); *G02F 1/136286* (2013.01); *G06F 3/044* (2013.01); *G06F 3/047* (2013.01); *G06F 3/0418* (2013.01); *G02F 2201/121* (2013.01)

(58) Field of Classification Search
CPC ...... G06F 3/0412; G06F 3/0418; G06F 3/044; G06F 3/047; G02F 1/133345; G02F 1/13338; G02F 1/134309; G02F 1/136286; G02F 1/1368; G02F 2201/121
See application file for complete search history.

(56) References Cited

U.S. PATENT DOCUMENTS

| | | | | |
|---|---|---|---|---|
| 2011/0261134 | A1* | 10/2011 | Arauchi | B41J 2/345 347/211 |
| 2014/0292709 | A1* | 10/2014 | Mizuhashi | G06F 3/0416 345/174 |
| 2015/0097810 | A1* | 4/2015 | Aoki | G06F 3/044 345/174 |
| 2017/0090629 | A1* | 3/2017 | Kim | G06F 3/0412 |

FOREIGN PATENT DOCUMENTS

JP  2010-257178 A  11/2010

* cited by examiner

*Primary Examiner* — Christopher J Kohlman
(74) *Attorney, Agent, or Firm* — Michael Best & Friedrich LLP

(57) ABSTRACT

A display device includes an array substrate and a counter substrate. The array substrate includes an outgoing line for connecting a first electrode for capacitive touch detection to a detection circuit. The outgoing line includes: a first wiring portion extended from the first electrode side to the detection circuit side; and a first capacitance adjusting wiring portion connected to the first wiring portion on the same layer and serving to adjust the total capacitance of the first electrode and the outgoing line.

20 Claims, 10 Drawing Sheets

F I G. 5
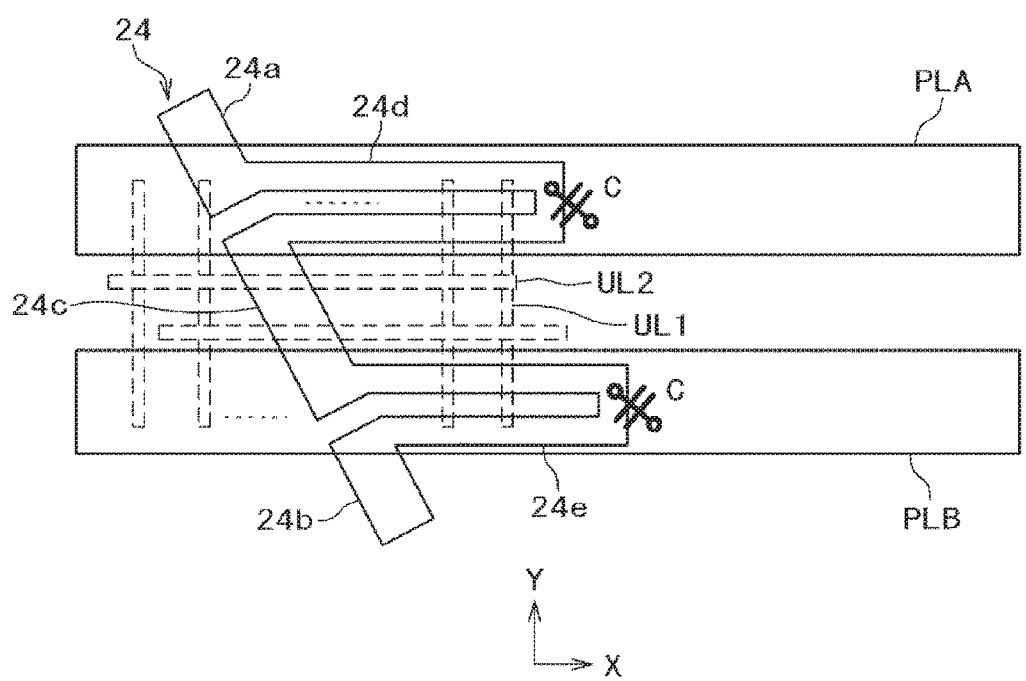

FIG. 6
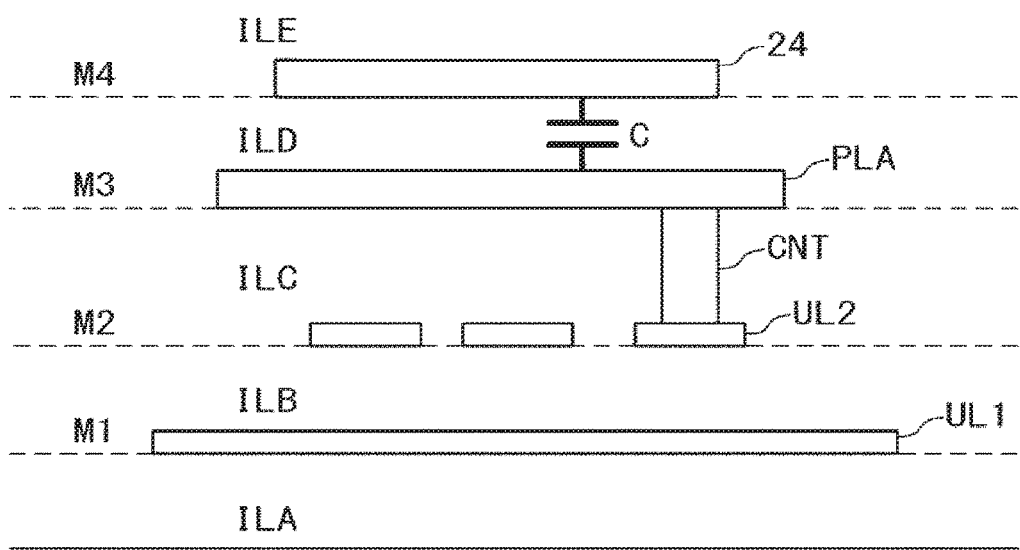
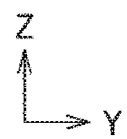

DISPLAY DEVICE

CLAIM OF PRIORITY

The present application claims priority from Japanese patent application No. 2016-27830 filed on Feb. 17, 2016, the content of which is hereby incorporated by reference into this application.

BACKGROUND

The present disclosure relates to a display device and is applicable to, for example, a display device including a touch detection electrode.

Recently, a display device integrating a so-called touch panel and a display device has been receiving attention. While some tough detection methods have been known, a capacitance detection method is known as one of them. There has been proposed a display device, for example, where a display common electrode originally mounted in the display device is also used as one of a pair of touch sensor electrodes while the other electrode (touch detection electrode) is so disposed as to intersect with this common electrode.

SUMMARY

By the way, it is generally desired that the touch detection device has uniform detection sensitivity on a touch detection surface thereof. In a capacitive touch detection device, however, the capacitances of outgoing lines of touch detection electrodes on an array substrate may vary due to the influences of signal lines and the like of lower layers, resulting in degraded uniformity of detection sensitivity.

An object of the invention is to provide a display device adapted to enhance the uniformity of touch detection sensitivities.

Other features and novel features of the invention will become more apparent from the following description of the disclosure and the accompanying drawings.

The abstract of typical features of this disclosure is briefly described as below.

That is, the display device includes an array substrate and a counter substrate. The array substrate includes: an image signal line; a scan signal line; a transistor connected to the image signal line and the scan signal line; and an outgoing line for connecting a first electrode for capacitive touch detection to a detection circuit. The outgoing line includes: a first wiring portion extended from the first electrode side to the detection circuit side; and a first capacitance adjusting wiring portion connected to the first wiring portion on the same layer and serving to adjust the total capacitance of the first electrode and the outgoing line.

BRIEF DESCRIPTION OF THE DRAWINGS

FIG. 5 is a diagram showing a configuration of an outgoing line of FIG. 1;

FIG. 6 is a sectional view schematically showing a principal part of the mount terminal side frame region of FIG. 1;

DESCRIPTION OF THE PREFERRED EMBODIMENTS

Figure 1:
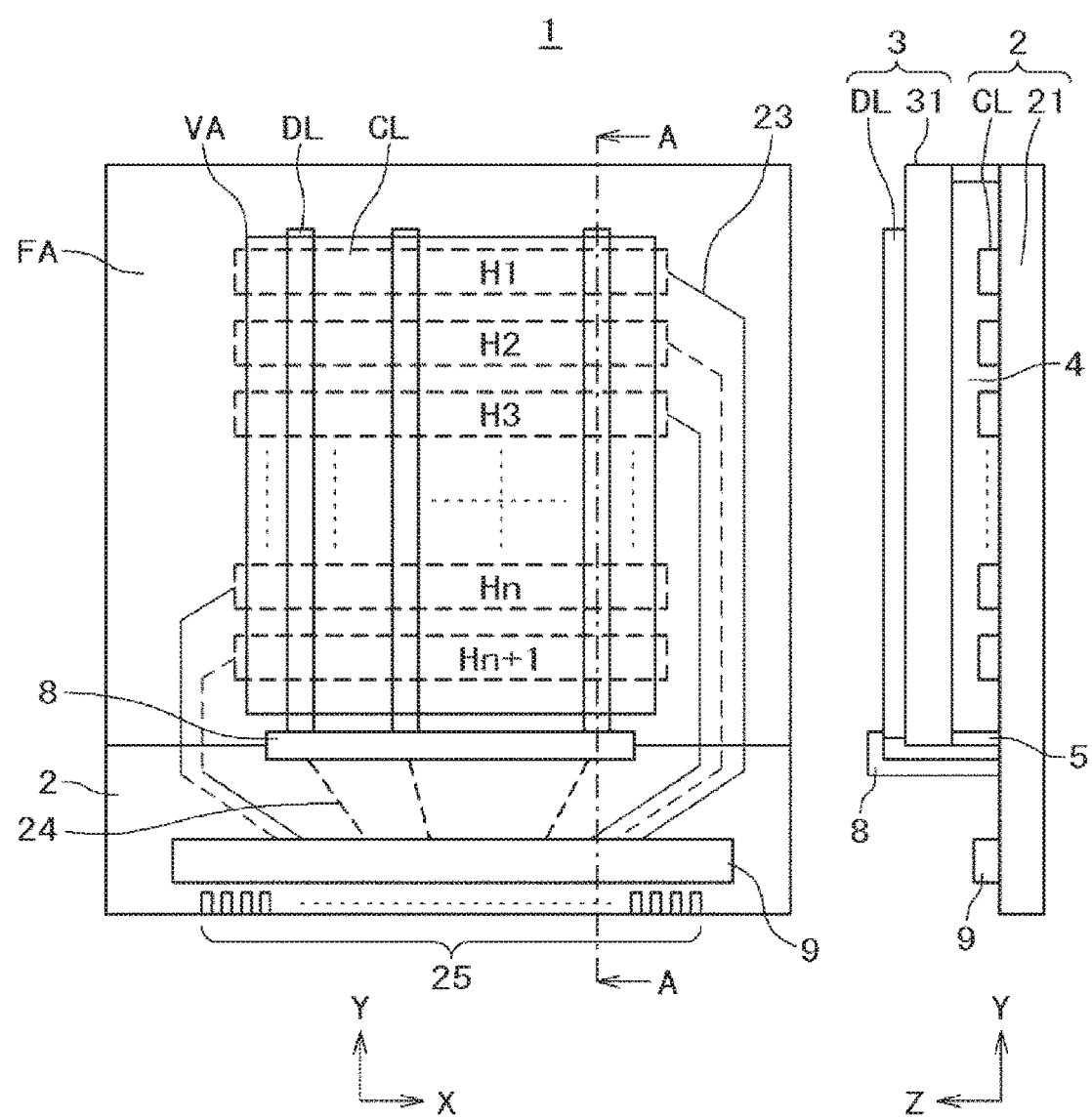
FIG. 1 is a diagram showing a configuration of a display device according to an embodiment of the invention.

For the reason of enhancing product design freedom, increasing the number of tiles in tiling process and the like, a display device incorporating a touch detection function is faced with a demand for narrowing a frame (frame on a mount terminal side, in particular). There is also a demand for increasing the number of touch detection lines in order to maintain/increase the positional precision in the trend of increasing the size of the display panel. The increase in the number of touch detection lines entails the enlargement of a frame region (peripheral region outside an effective display region). Therefore, it is practically difficult to satisfy the above two demands in the present circumstances. Since the display device also needs to maintain touch detection sensitivity, an arrangement must be made in consideration of signals (noises) of wirings in the peripheral region.

The narrow frame design can be accomplished by arranging wiring layers of the display panel in a multilayer configuration. However, the self capacitance (capacitance value) of the touch detection line varies depending upon superimposition with other touch detection lines or condition of other adjoining wirings. Further, touch detection accuracy (sensitivity) may be lowered due to the signals (noises) from other wirings.

All or some of the touch detection lines (touch detection electrodes principally disposed in the effective display region, and outgoing lines disposed outside the effective display region so as to connect the touch detection electrodes to the detection circuit) are disposed on the array substrate. In this configuration, redundancy patterns are provided for reducing the variations of parasitic capacitance of the touch detection lines (for homogenizing parasitic capacitances). The redundancy patterns are preferably configured to be selectively disposed at places where the redundancy patterns are superimposed on power wires less susceptible to noises from other wirings. A wiring line as thick as the power wire is preferred because an opposed electrode is required for forming a capacitance and a thin signal line is significantly varied in thickness. The power wires are laid on a side comparatively close to the array substrate while an insulation film interposed between the redundancy patterns and the power wires is thin. Hence, the redundancy patterns are adapted not only to increase capacitance (easy to homogenize the capacitances) but also to function as a shield. The power wire opposed to the redundancy pattern may be connected to a power source for a normally mounted test circuit or to any of a variety of supply voltages (VGH, VGL, VDH, GND, etc.) used for gate drive circuit or the like.

Thus, the loads of plural touch detection lines can be equalized so that favorable touch detection accuracies can be maintained without expanding the frame region. Furthermore, the redundancy patterns are laid on the same layer as the touch detection lines. This negates the need for adding another wire layer (no need for changing process).

The following description is made on an embodiment of the invention, a comparative example and exemplary modifications with reference to the accompanying drawings. It is noted that the disclosure is merely an exemplary representation of the invention and those changes and modifications for those skilled in the art to easily arrive at without departing from the scope and spirit of the invention are naturally construed as being included therein. For purposes of clarity of the drawings, the drawings may schematically illustrate the width, thickness, shape and the like of the components in contrast to the practical embodiments. The drawings merely show an example of the invention and do not mean to limit the interpretation of the invention. In this description and the drawings, like reference characters refer to the corresponding components and the detailed description thereof is dispensed with.

While the following embodiment of the invention is described with reference to an example of a liquid crystal display device, the invention is not limited to this. The invention is applicable to any configuration where the outgoing lines of the touch detection electrodes are laid on the array substrate.

Embodiment

Figure 2:
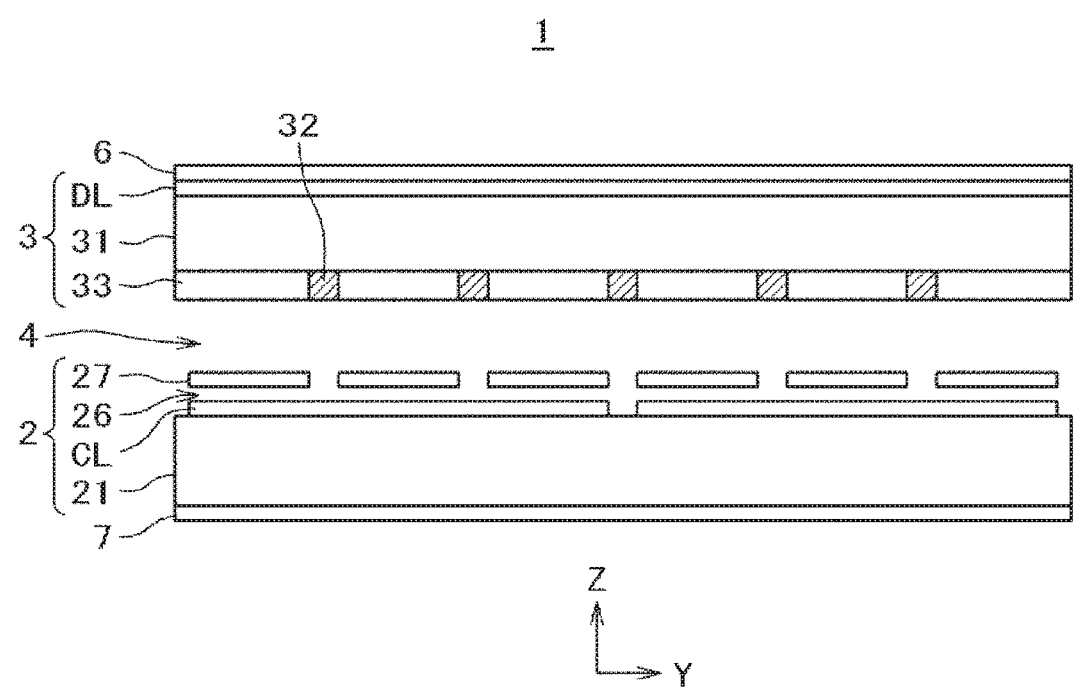
FIG. 2 is a diagram showing a cross-sectional configuration of a principal part of the display device of FIG. 1.

FIG. 1 is a diagram showing a configuration of a display device according to an embodiment of the invention. A left-side part of the figure is a schematic plan view while a right-side part thereof is a schematic sectional view. FIG. 2 is a diagram showing a cross-sectional configuration of a principal part of the display device of FIG. 1. A display device 1 according to the embodiment is a device of a so-called in-cell touch panel type which employs a liquid crystal display element as a display element thereof and integrates a liquid crystal display device composed of the liquid crystal display elements and a capacitive touch detection device (touch sensor).

The display device 1 includes: an array substrate 2; a counter substrate 3 opposed to the array substrate 2; and a liquid crystal layer 4 interposed between the array substrate 2 and the counter substrate 3.

As shown in FIG. 2, the array substrate 2 includes: a TFT board 21 made of glass, resin or the like; a common electrode CL; and a pixel electrode 27 to be described hereinlater. The TFT board 21 is formed with a variety of electrodes, wirings, a thin film transistor (TFT) and the like. The common electrodes CL are formed between the TFT board 21 and the liquid crystal layer. The common electrode CL is an electrode for supplying a common voltage to a plurality of subpixels PXs (to be described hereinlater) and has translucency. The common electrode CL is also used by the touch sensor as an electrode for applying a drive signal (Vcom). As shown in FIG. 1, the common electrodes CL are arranged in parallel to extend in one direction (X direction) across an effective display region VA where the display device 1 performs image display. Each of the common electrodes CL is so formed as to extend to the outside (frame region FA) of the effective display region VA. An insulation film 26 is formed between the common electrode CL and the pixel electrodes. The pixel electrode 27 is an electrode for supplying an image signal for performing image display and has translucency. The common electrode CL and the pixel electrode 27 are formed from ITO (Indium Oxide), for example.

As shown in FIG. 2, the counter substrate 3 includes: a glass substrate 31; a black matrix 32; a color filter 33; and a touch detection electrode (hereinafter, simply referred to as "detection electrode") DL. The color filter 33 is formed on one surface of the glass substrate 31 (surface on the side of the liquid crystal layer 4). The color filter 33 has a configuration where three color filter layers of red (R), green (G) and blue (B) are periodically arranged. A set of three color filter layers R, G, B is provided in correspondence to each display pixel. The black matrix 32 is a light shielding layer which is disposed in between the R, G, B color filter layers of the color filter 33 and at the frame region FA. On the other surface of the glass substrate 31, the detection electrodes DL are arranged in parallel and extended in the other direction (Y direction) across the effective display region VA, intersecting with the common electrodes CL. Each of the detection electrodes DL is so formed as to extend to the outside (frame region FA) of the effective display region VA. The detection electrode DL is an electrode for outputting a touch detection signal (Vdet) in the touch sensor. The detection electrode DL is an electrode formed from ITO or a metal, for example. The detection electrode DL is connected to a flexible print circuit board (FPC) 8 for outputting the touch detection signal (Vdet) to a driver IC 9 or to the outside of the display panel. A polarizer 6 is overlaid on the detection electrode DL (on the opposite side from the liquid crystal layer). A cover glass (not shown) is overlaid on the polarizer. Incidentally, the glass substrate 31 may be a substrate formed from a resin or the like other than glass.

The liquid crystal layer 4 functions as a display functioning layer which modulates transmitted light according to the state of electric field. This electric field is formed by a potential difference between the voltage of the common electrode CL and the voltage of the pixel electrode 27. While the liquid crystal layer 4 employs a liquid crystal of transverse electric field mode such as IPS (In-Plane Switching), the usable liquid crystal is not particularly limited. The liquid crystal layer 4 is sealed between the array substrate 2 and the counter substrate 3 by means of a seal 5.

An alignment film is interposed between the liquid crystal layer 4 and the array substrate 2, and between the liquid crystal layer 4 and the counter substrate 3, respectively. An incident-side polarizer 7 and an unillustrated backlight are disposed on an underside (side opposite from the liquid crystal layer 4) of the array substrate 2.

Figure 3:
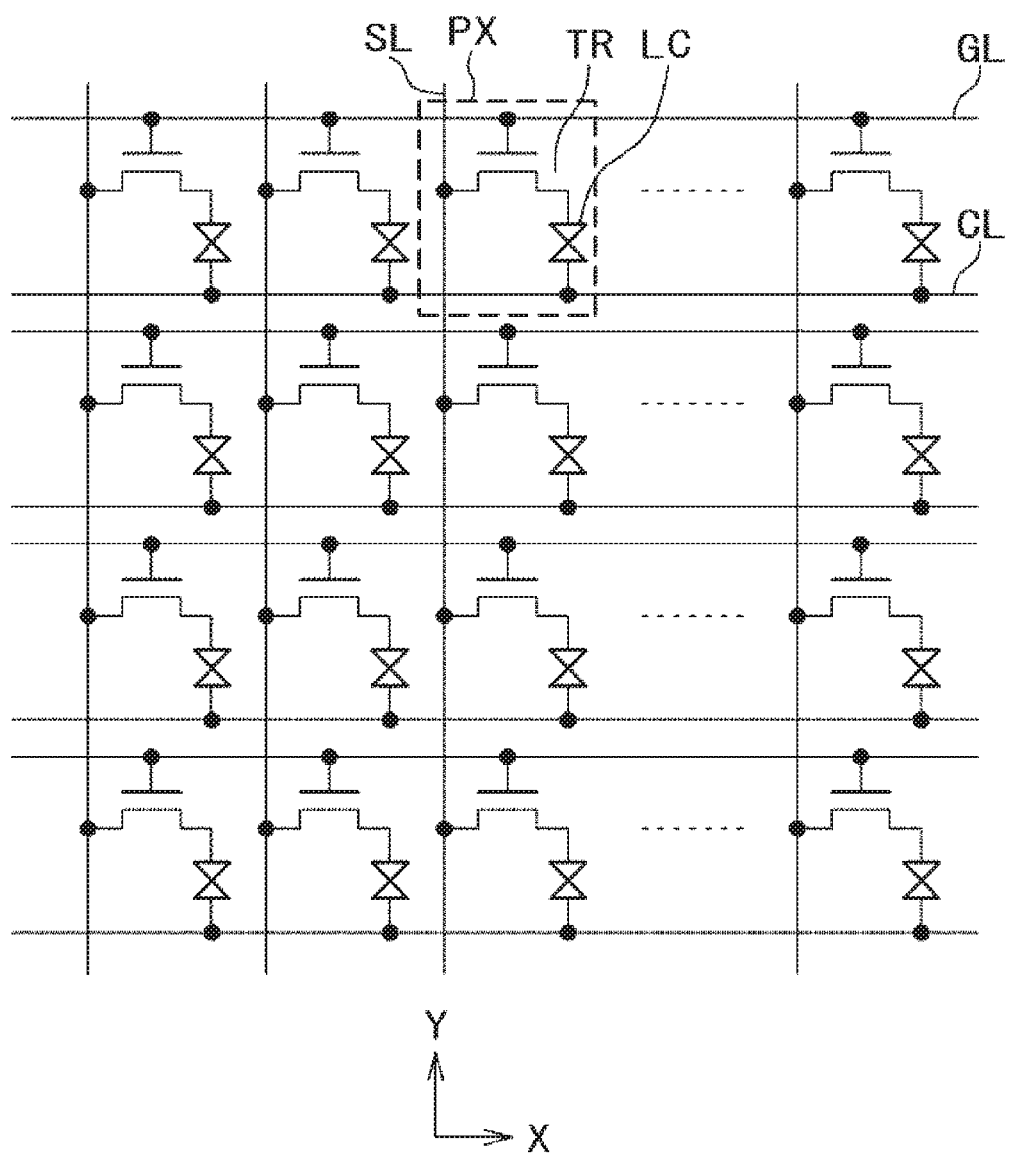
FIG. 3 is a diagram showing an arrangement of pixel structures in the display device according to the embodiment.

FIG. 3 is a diagram showing an arrangement of pixel structures in the display device according to the embodiment. The display device 1 includes a plurality of subpixels PXs arranged in a matrix form. The subpixel PX includes a TFT element TR and the pixel electrode. The TFT element TR is formed of a thin film transistor. In this embodiment, the TFT element TR is formed of an n-channel MOS (Metal Oxide Semiconductor) TFT. The TFT element TR has a source connected to an image signal line SL extended in the Y direction, a gate connected to a scan signal line GL, and a drain connected to the pixel electrode. A liquid crystal element LC is driven by potential difference between the pixel electrode and the common electrode CL.

The gate of the TFT element TR of the subpixel PX is connected to a gate of a TFT element TR of another subpixel PX belonging to the same row of the display device 1 by means of the scan signal line GL. The source of the TFT element TR of the subpixel PX is connected to a source of a TFT element TR of another subpixel PX belonging to the same column of the display device 1 by means of the image signal line SL.

The touch sensor of the display device 1 is composed of the common electrode CL disposed on the array substrate 2 and the detection electrode DL disposed on the counter substrate 3. As shown in FIG. 1, the common electrode CL is composed of a plurality of electrode patterns (H1, H2, H3, . . . , Hn, Hn+1) extended in a transverse direction (X direction) as seen in the figure and arranged in stripes. When a touch detection operation is performed, the drive signal (Vcom) is sequentially supplied to the individual electrode patterns of the common electrode CL so as to perform scan drive in a time-sharing fashion. The detection electrode DL is composed of a plurality of electrode patterns extended in a direction intersecting with the extension direction of the electrode patterns of the common electrode CL and arranged in stripes. The mutually intersecting electrode patterns of the common electrode CL and the detection electrode DL form capacitances at the respective intersections. The individual electrode patterns of the detection electrode DL are connected to the driver IC 9 via the FPC 8 and the outgoing lines 24, so that touch detection is performed based on the touch detection signal (Vdet) supplied from the detection electrode DL. The detection electrodes DL and the outgoing lines 24 are collectively referred to as the detection line. The driver IC 9 includes: circuits for driving the image signal lines SL, the scan signal lines GL and common electrode drive lines 23; a touch detection circuit for performing touch detection based on the touch detection signal (Vdet); and the like. Instead of being incorporated in the driver IC 9, the touch detection circuit may be disposed at an end (external of the display panel) of the FPC (not shown) connected to an external connection terminal 25.

The mutually intersecting electrode patterns form capacitive touch sensor elements arranged in the matrix form. Therefore, a contact position or an approaching position of an external approaching object can be detected by sequentially scanning the overall effective display region VA of the display device 1.

Next, a brief description is made on the overall operations of the display device 1 with reference to FIG. 1 to FIG. 3. In display operations, the electric field is generated in the liquid crystal layer 4 based on the signals supplied to the pixel electrodes 27 and the common electrodes CL. The electric field varies the orientation of liquid crystal molecules so that the transmitted light is modulated whereby the image display is accomplished. In the touch detection operation, the drive signal (Vcom) is sequentially supplied to the common electrodes CL, transmitted to the detection electrodes DL via the capacitances formed between the common electrodes CL and the detection electrodes DL, and finally outputted as the touch detection signal (Vdet). The touch detection signal (Vdet) is supplied to the driver IC 9 or an external touch detection circuit via the outgoing lines 24 such that the presence or absence of touch is determined or a touch position is detected. An alternative configuration may also be made such that the drive signal (Vcom) is supplied by an external touch detection circuit.

Figure 4:
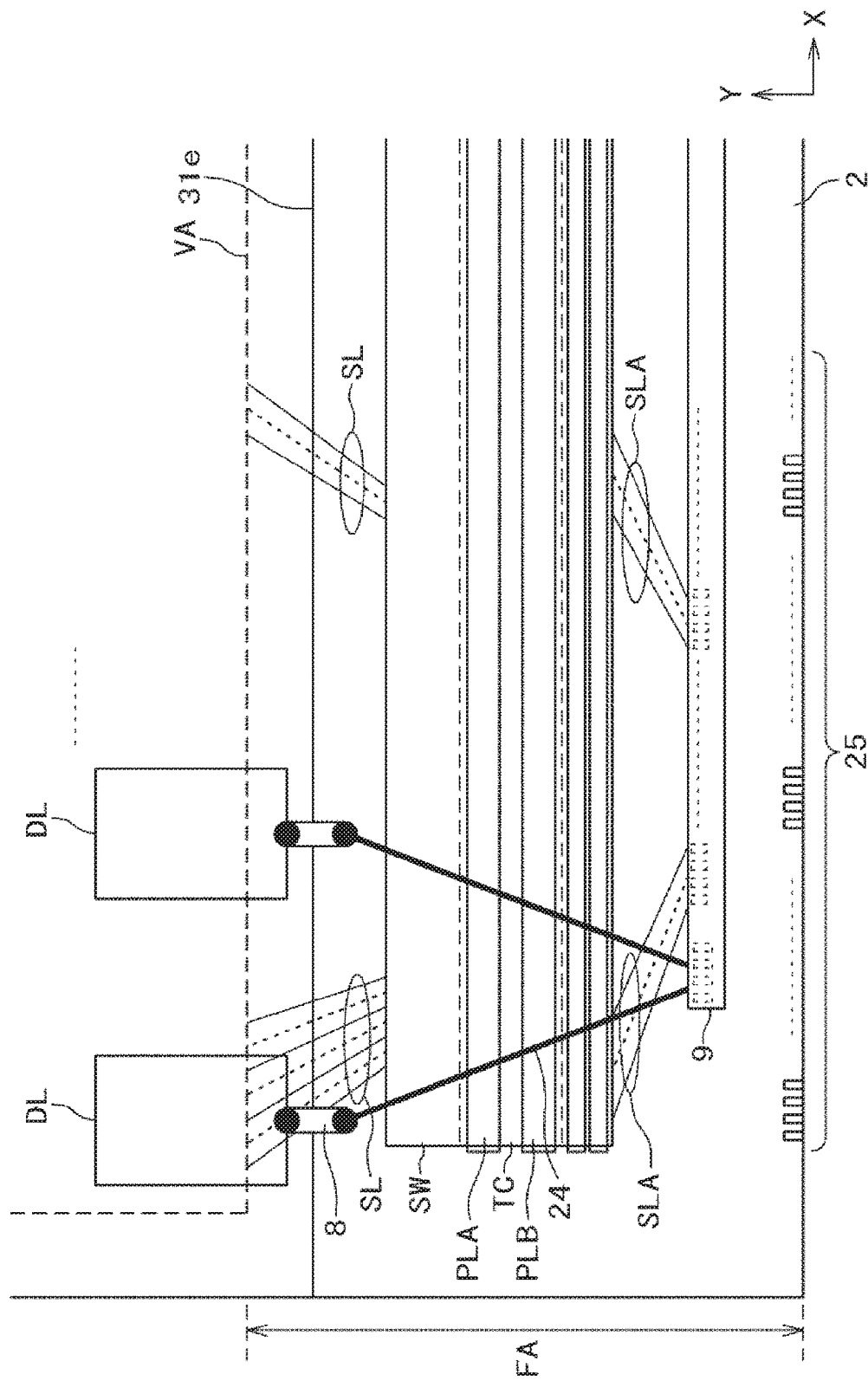
FIG. 4 is an enlarged view of a mount terminal side frame region of FIG. 1.

FIG. 4 is an enlarged view of a mount terminal side frame region of FIG. 1. A mount region on the external connection terminal 25 side of the array substrate 2 (region where the array substrate 2 is not opposed to the counter substrate 3) includes: an image signal line SLA outgoing from the driver IC 9; a test circuit TC; a first power wire PLA connected to the test circuit TC and the like; a second power wire PLB; a selector SW; the image signal line SL outgoing from the selector SW; the outgoing line 24 for the touch detection signal (Vdet); the external connection terminal 25; terminals for connection with the terminals of the driver IC 9; and the like. The first power wire PLA and the second power wire PLB are extended in the X direction.

An end of the detection electrode DL disposed at the counter substrate 3 is connected to the outgoing line 24 of the array substrate 2 by means of the FPC 8 so disposed as to cover a glass substrate end 31e. The outgoing line 24 is principally extended in a diagonal direction with respect to the Y direction, intersecting with the selector SW, the test circuit TC, the first power wire PLA, the second power wire PLB, the image signal lines SL, SLA and the like.

A lead-out wiring of the detection line is described with reference to FIG. 5 to FIG. 8. FIG. 5 is a plan view showing a configuration of the outgoing line of FIG. 1. FIG. 6 is a sectional view schematically showing a principal part of the mount terminal side frame region of FIG. 1.

The outgoing line 24 is extended from the detection electrode DL side to the detection circuit side (the driver IC 9 side or the external connection terminal side, hereinafter simply referred to as "the driver IC 9 side"), on an upper layer (distal side from the TFT board) of the first power wire PLA, the second power wire PLB, a first signal line UL, and a second signal line UL2 as intersecting with wire lines thereof. The outgoing line 24 includes a wiring pattern which is extended from the detection electrode DL side to the driver IC 9 side and includes a first wiring portion 24a, a second wiring portion 24b and a third wiring portion 24c. The outgoing line 24 further includes redundancy patterns of: a first capacitance adjusting wiring portion 24d having an open-ended rectangular shape and connecting the first wiring portion 24a and the third wiring portion 24c; and a second capacitance adjusting wiring portion 24e having an open-ended rectangular shape and connecting the second wiring portion 24b and the third wiring portion 24c.

A first insulation film ILA is formed on the TFT board 21 of the array substrate 2. The first signal line UL1 is composed of a first conductive layer M1 and is formed on the first insulation film ILA (the distal side from the TFT board 21). A second insulation film ILB is formed on the first signal line UL1. The second signal line UL2 is composed of a second conductive layer M2 and is formed on the second insulation film ILB. A third insulation film ILC is formed on the second signal line UL2. The first power wire PLA and the second power wire PLB are composed of a third conductive layer M3 and is formed on the third insulation film ILC. A fourth insulation film ILD is formed on the first power wire PLA and the second power wire PLB. The first power wire ILA is connected to the second signal line UL2 via a contact CNT. The outgoing line 24 is composed of a fourth conductive layer M4 and is formed on the fourth insulation film ILD. A fifth insulation film ILE is formed on the outgoing line 24. The formation of the fifth insulation film ILE may be omitted (The outgoing line 24 may define the uppermost layer exposed to the atmosphere). Alternatively, the outgoing line 24 may also be composed of ITO. Each of the conductive layers may be formed of a transparent conductive film such as ITO or a metal film.

The first capacitance adjusting wiring portion 24d and the second capacitance adjusting wiring portion 24e are laid on the first power wire PLA and the second power wire PLB via the fourth insulation film ILD, respectively. A parasitic capacitance C between the first capacitance adjusting wiring portion 24d and the first power wire PLA, and a parasitic capacitance C between the second capacitance adjusting wiring portion 24e and the second power wire PLB are used for capacitance adjustment of the detection lines. The first capacitance adjusting wiring portion 24d and the second capacitance adjusting wiring portion 24e are so disposed as to overlap with the first power wire PLA and the second power wire PLB as seen in plan, respectively.

Figure 7:
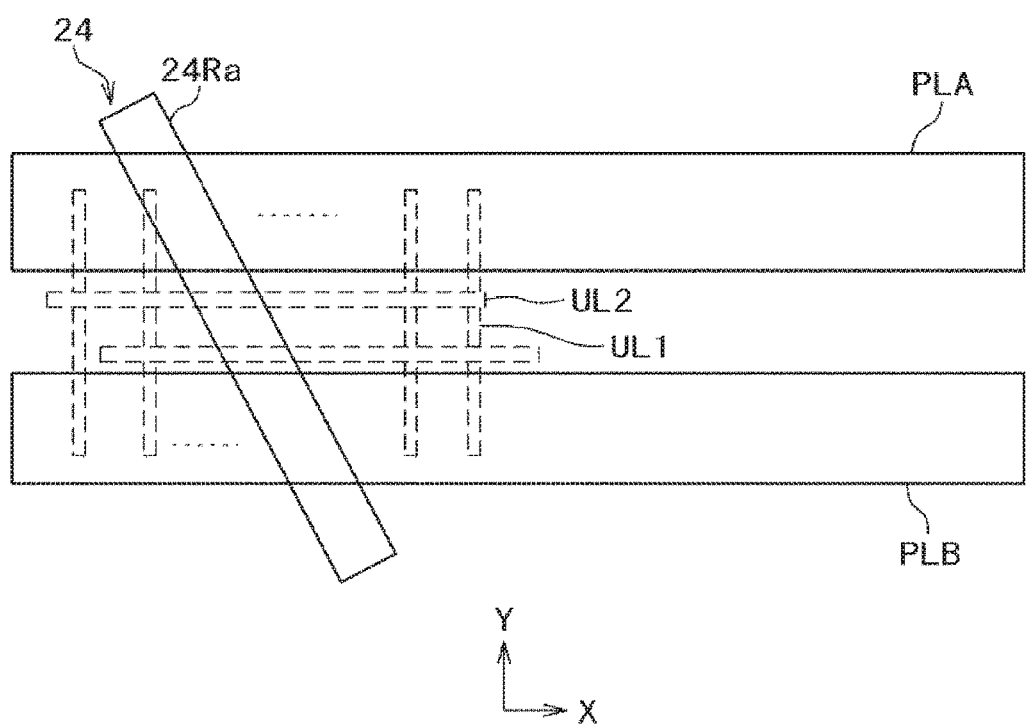
FIG. 7 is a diagram showing a configuration of an outgoing line of a display device according to a comparative example.
Figure 8:
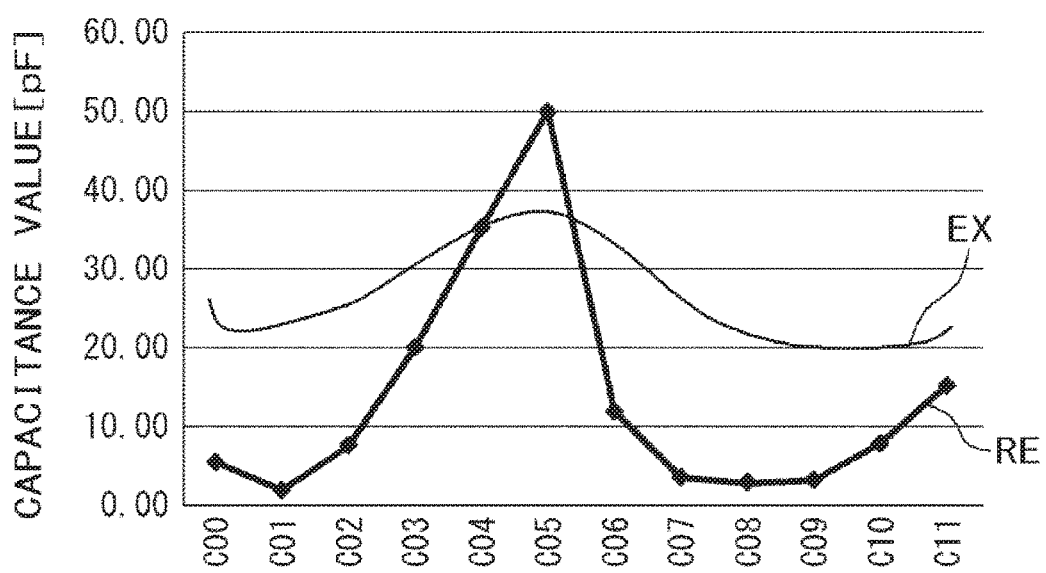
FIG. 8 is a graph showing a capacitance distribution of detection wirings.

FIG. 7 is a plan view showing a configuration of an outgoing line of a display device according to a comparative example. FIG. 8 is a graph showing capacitance distributions of the detection lines regarding the comparative example and the embodiment where twelve detection lines are arranged in parallel.

As shown in FIG. 7, an outgoing line 24R of a display device according to the comparative example has a wiring pattern of a wiring portion 24Ra extended from the detection electrode DL toward the driver IC 9 but does not include the redundancy patterns of the first capacitance adjusting wiring portion 24d and the second capacitance adjusting wiring portion 24e such as those of the embodiment. The other components are the same as those of the display device according to the embodiment.

As shown in FIG. 8, a characteristic curve of the comparative example (RE) indicates that the detection lines at end parts have small capacitances while the detection lines at a central part have large capacitances. According to the embodiment where the parasitic capacitances of the capacitance adjusting wiring portions are adjusted by varying the redundancy patterns of the capacitance adjusting wiring portions of the individual detection lines (for example, by changing the X-length of the open-ended rectangular shape or the width of the wire line), a characteristic curve thereof (EX) indicates a more uniform capacitance distribution of the detection lines. For the parasitic capacitance adjustment, the first wiring portion 24a may be extended to be connected to the third wiring portion 24c or otherwise the second wiring portion 24b may be extended to be connected to the third wiring portion 24c. Further, the configurations of the first capacitance adjusting wiring portion 24d and the second capacitance adjusting wiring portion 24e may be varied. All the outgoing lines need not be provided with the redundancy patterns. In some case, for example, the central detection line need not be provided with the redundancy pattern. Since the capacitance varies depending upon the width of the outgoing line, the thickness of the insulation film, the length of the outgoing line, the width of the wiring between the outgoing line and the TFT board, or the area of the intersecting region, the comparative example merely represents an example.

First Exemplary Modification

Figure 9:
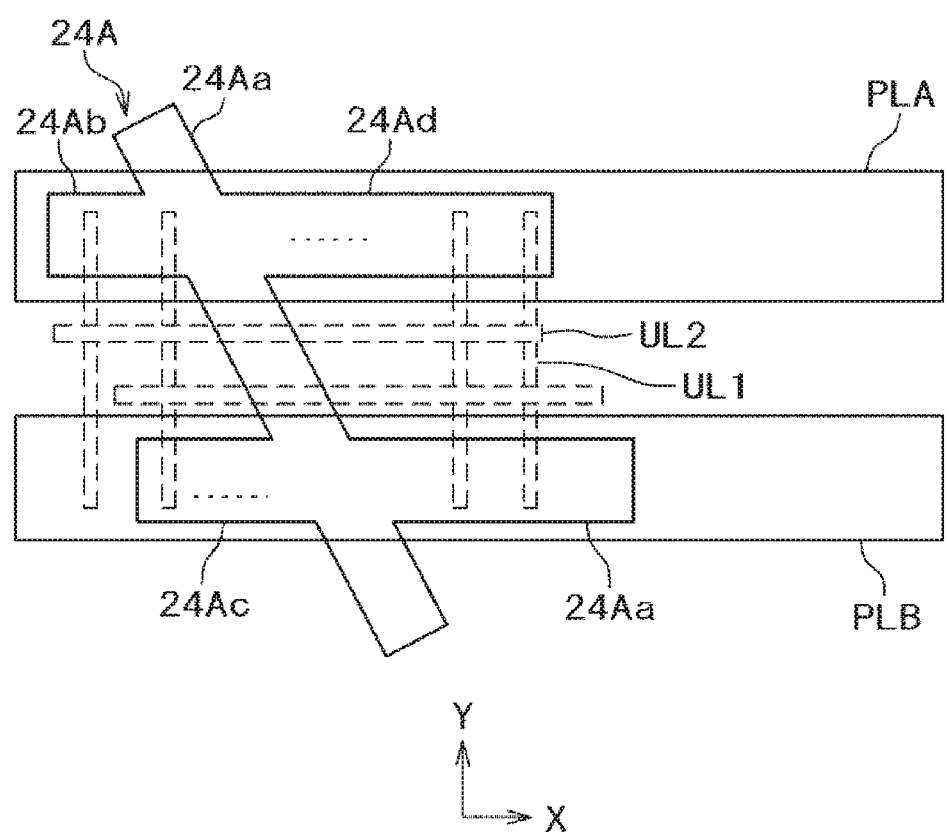
FIG. 9 is a diagram showing a configuration of an outgoing line of a display device according to a first exemplary modification.

FIG. 9 is a plan view showing a configuration of an outgoing line of a display device according to a first exemplary modification. An outgoing line 24A of the display device according to the first exemplary modification includes a wiring pattern of a first wiring portion 24Aa extended from the detection electrode DL side to the driver IC 9 side. The outgoing line 24A further includes a redundancy pattern of: a first capacitance adjusting wiring portion 24Ab and a second capacitance adjusting wiring portion 24Ac which are extended in a −X direction from the first wiring portion 24Aa; a third capacitance adjusting wiring portion 24Ad and a fourth capacitance adjusting wiring portion 24Ae which are extended in the X direction from the first wiring portion 24Aa. The first capacitance adjusting wiring portion 24Ab and the third capacitance adjusting wiring portion 24Ad are provided with a fourth interlayer insulation film ILD on the first power wire PLA. The second capacitance adjusting wiring portion 24Ac and the fourth capacitance adjusting wiring portion 24Ae are provided with the fourth interlayer insulation film ILD on the second power wire PLB. The first capacitance adjusting wiring portion 24Ab and the third capacitance adjusting wiring portion 24Ad are so disposed as to overlap with the first power wire PLA as seen in plan. The second capacitance adjusting wiring portion 24Ac and the fourth capacitance adjusting wiring portion 24Ae are so disposed as to overlap with the second power wire PLB as seen in plan. The other components are the same as those of the display device according to the embodiment.

According to the first exemplary modification, the parasitic capacitance is adjusted by changing the length (the length in the X direction) or the width (the length in the Y direction) of the first capacitance adjusting wiring portion 24Ab, the second capacitance adjusting wiring portion 24Ac, the third capacitance adjusting wiring portion 24Ad and the fourth capacitance adjusting wiring portion 24Ae, for example.

Second Exemplary Modification

Figure 10:
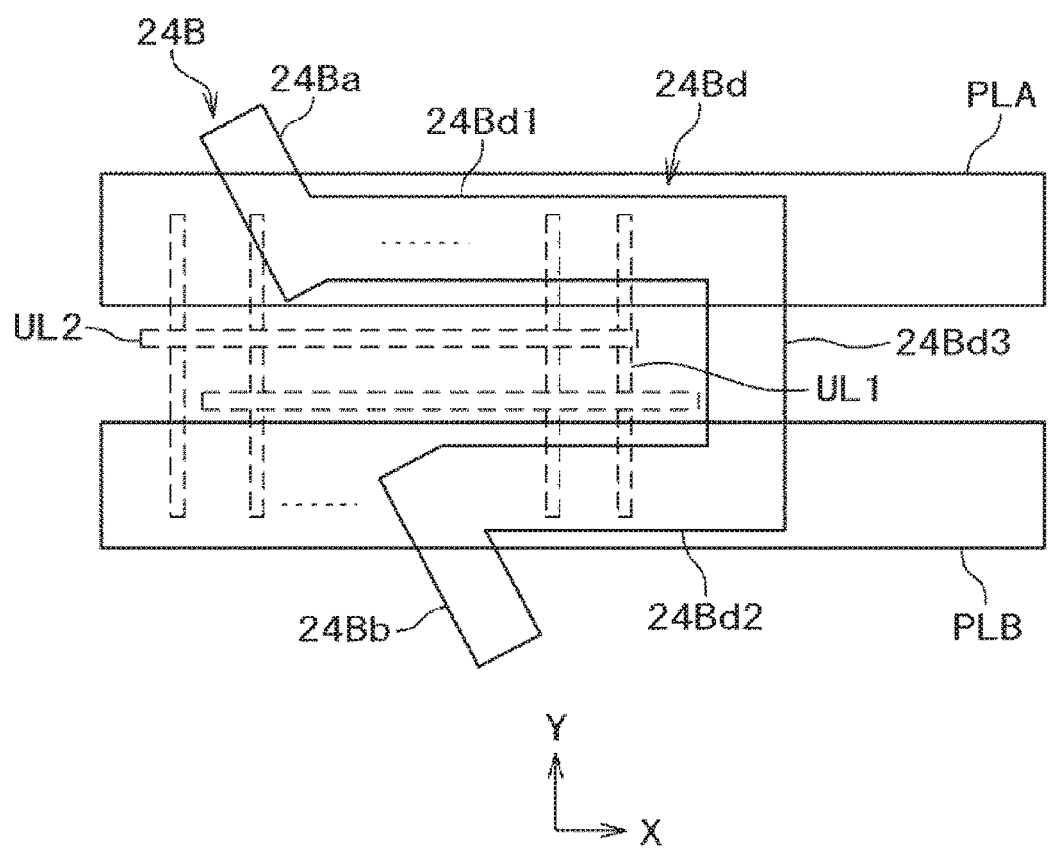
FIG. 10 is a diagram showing a configuration of an outgoing line of a display device according to a second exemplary modification.

FIG. 10 is a plan view showing a configuration of an outgoing line of a display device according to a second exemplary modification. An outgoing line 24B of the display device according to the second exemplary modification includes a wiring pattern of: a first wiring portion 24Ba and a second wiring portion 24Bb which are extended from the detection electrode DL side to the driver IC 9 side. The outgoing line 24B further includes a redundancy pattern of a capacitance adjusting wiring portion 24Bd having an open-ended rectangular shape and connecting the first wiring portion 24Ba and the second wiring portion 24Bb. The capacitance adjusting wiring portion 24Bd includes: a linear portion 24Bd1 extended on the first power wire PLA and from the first wiring portion 24Ba in the X direction; a linear portion 24Bd2 extended on the second power wire PLB and from the second wiring portion 24Bb in the X direction; and a linear portion 24Bd3 connecting the linear portion 24Bd1 and the linear portion 24Bd2. The linear portion 24Bd1 of the capacitance adjusting wiring portion 24Bd is provided with the fourth interlayer insulation film ILD on the first power wire PLA, while the linear portion 24Bd2 thereof is provided with the fourth interlayer insulation film ILD on the second power wire PLB. The linear portion 24Bd1 is so disposed as to overlap with the first power wire PLA as seen in plan. The linear portion 24Bd2 is so disposed as to overlap with the second power wire PLB as seen in plan. The other components are the same as those of the display device according to the embodiment.

According to the second exemplary modification, the parasitic capacitance is adjusted by changing the length (the length in the X direction) or the width (the length in the Y direction) of the linear portions 24Bd1, 24Bd2 of the capacitance adjusting wiring portion 24Bd, for example. The linear portion 24Bd1 may be extended from the first wiring portion 24Ba in the −X direction and on the first power wire PLA and while the linear portion 24Bd2 may be extended from the second wiring portion 24Bb in the −X direction and on the second power wire PLB.

The outgoing line may be configured to combine two or more of the features of the embodiment, first exemplary modification and second exemplary modification.

According to the embodiment, the detection electrode DL is disposed on the glass substrate 31 (on the polarizer 6 side thereof). However, the detection electrode may also be disposed on the array substrate 2 between the common electrode CL and the liquid crystal layer 4. While the embodiment is based on mutual capacitance between the common electrode CL and the detection electrode DL, the invention is also applicable to the outgoing line of an electrode of a self-capacitance system where the detection signal is extracted from the detection electrode DL while supplying the drive signal to the detection electrode DL. The layer of the outgoing line or the layer of the power wire is not particularly limited but the outgoing line or the power wire may employ another conductive layer. All outgoing lines need not be provided with the capacitance adjusting wiring portion. Some of the outgoing lines are provided with the capacitance adjusting wiring portion while the other outgoing lines may have the configuration of the above-described comparative example. The length or width of the capacitance adjusting wiring portion or the area of the overlapping portion between the capacitance adjusting wiring portion and the power wire may be varied for each of the outgoing lines. The voltage supplied to each power wire may be a gate high voltage, a gate low voltage or a ground voltage supplied to the gate drive circuit, or a voltage of other power source. Otherwise, the power wire may be supplied with a control voltage supplied to each transistor of the selector SW, a common voltage supplied to the common electrode, or the like.

What is claimed is:

1. A liquid crystal display device comprising:
   an array substrate;
   a counter substrate;
   an image signal line;
   a scan signal line;
   a transistor connected to the image signal line and the scan signal line; and
   an outgoing line for connecting a first electrode for capacitive touch detection to a detection circuit, and
   a first power supply wiring disposed on a layer different from that of the outgoing line, wherein
   the outgoing line includes:
     a first wiring portion extended from the first electrode toward the detection circuit; and
     a first capacitance adjusting wiring portion connected with the first wiring portion,
   the first wiring portion intersects the first power supply wiring, and
   the first capacitance adjusting wiring portion is overlapped with the first power supply wiring in planar view and extends along the first power supply wiring from the first wiring portion.

2. The display device according to claim 1, further comprising
   a signal line disposed on a layer on the opposite side from the layer of the outgoing line with respect to the layer of the first power supply wiring.

3. The display device according to claim 1, wherein
   the outgoing line further includes a second capacitance adjusting wiring portion for capacitance adjustment which is formed on the same layer as the first wiring portion, and
   the array substrate further includes a second power supply wiring disposed on the same layer as the first power supply wiring.

4. The display device according to claim 3, wherein
   the outgoing line further includes a second wiring portion,
   the second wiring portion intersects the second power supply wiring and connects the second capacitance adjusting wiring portion, and
   the second capacitance adjusting wiring portion is disposed to overlap with the second power supply wiring in planar view and extends along the second power supply wiring from the second wiring portion.

5. The display device according to claim 4, wherein
   the first capacitance adjusting wiring portion has a first end which is away from the first wiring portion, and
   the second capacitance adjusting wiring portion has a second end which is away from the second wiring portion.

6. The display device according to claim 5, wherein
   the outgoing line further includes a third wiring portion which is connected to the first capacitance adjusting wiring portion and the second capacitance adjusting wiring portion on the same layer.

7. The display device according to claim 6, wherein
   the third wiring portion connects the first end of the first capacitance adjusting wiring portion and the second end of the first capacitance adjusting wiring portion, and
   the first capacitance adjusting wiring portion and the second capacitance adjusting wiring portion each has a wiring pattern shaped like an open-ended rectangle.

8. The display device according to claim 1, wherein
   the outgoing line further includes a second capacitance adjusting wiring portion for capacitance adjustment which is formed on the same layer as the first wiring portion,
   the second capacitance adjusting wiring portion is overlapped with the first power supply wiring in planar view and extends along the first power supply wiring from the first wiring portion.

9. The display device according to claim 8, wherein
   the outgoing line further includes a third capacitance adjusting wiring portion connecting the first capacitance adjusting wiring portion and the second capacitance adjusting wiring portion.

10. The display device according to claim 1, further comprising
    a common electrode, wherein
    the common electrode is a driving electrode for touch sensor, and
    the first electrode is a detection electrode for the touch sensor.

11. The display device according to claim 10, wherein
    the first electrode is disposed on the array substrate.

12. The display device according to claim 1, wherein
    the first electrode is disposed on the array substrate and is an electrode for a self-capacitance type touch sensor.

13. A display device comprising:
    an array substrate;
    a counter substrate;
    an image signal line;
    a scan signal line;
    a transistor connected to the image signal line and the scan signal line;
    an outgoing line for connecting a first electrode for capacitive touch detection to a detection circuit, and
    a first power supply wiring extended in a first direction, wherein
    the outgoing line is extended in a second direction intersecting with the first direction, and
    the outgoing line includes:
      a first wiring portion extended in the second direction, and
      a first capacitance adjusting wiring portion extended from the first wiring portion in the first direction and overlapped with the first power supply wiring in a planar view.

14. The display device according to claim 13, wherein the outgoing line is disposed on the first power supply wiring via an interlayer insulation film.

15. The display device according to claim 13, wherein the outgoing line further includes a second capacitance adjusting wiring portion for capacitance adjustment which is formed on the same layer as the first wiring portion, and the array substrate further includes a second power supply wiring disposed on the same layer as the first power supply wiring.

16. The display device according to claim 15, wherein the outgoing line further includes a second wiring portion, the second wiring portion intersects the second power supply wiring and connects the second capacitance adjusting wiring portion, the second capacitance adjusting wiring portion is disposed to overlap with the second power supply wiring in planar view and extends along the second power supply wiring from the second wiring portion.

17. The display device according to claim 16, wherein the first capacitance adjusting wiring portion has a first end which is away from the first wiring portion, and the second capacitance adjusting wiring portion has a second end which is away from the second wiring portion.

18. The display device according to claim 17, wherein the outgoing line further includes a third wiring portion extended in the first direction and connected to the first capacitance adjusting wiring portion and the second capacitance adjusting wiring portion on the same layer.

19. The display device according to claim 18, wherein the third wiring portion connects the first end of the first capacitance adjusting wiring portion and the second end of the first capacitance adjusting wiring portion, and the first capacitance adjusting wiring portion and the second capacitance adjusting wiring portion each has a wiring pattern shaped like an open-ended rectangle.

20. The display device according to claim 13, wherein the outgoing line further includes a second capacitance adjusting wiring portion for capacitance adjustment which is formed on the same layer as the first wring portion, the second capacitance adjusting wiring portion is overlapped with the first power supply wiring in a planar view and extends along the first power supply wiring from the first wiring portion.

* * * * *